(12) United States Patent
Kawakita et al.

(10) Patent No.: US 8,074,444 B2
(45) Date of Patent: Dec. 13, 2011

(54) EXHAUST EMISSION CONTROL DEVICE

(75) Inventors: Shinichiro Kawakita, Oobu (JP); Keiji Ohshima, Gamagoori (JP); Yoshiaki Nishijima, Toyokawa (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 839 days.

(21) Appl. No.: 12/099,978

(22) Filed: Apr. 9, 2008

(65) Prior Publication Data

US 2008/0264043 A1  Oct. 30, 2008

(30) Foreign Application Priority Data

Apr. 26, 2007 (JP) ................. 2007-116656

(51) Int. Cl.
*F01N 3/18* (2006.01)
(52) U.S. Cl. .......................................... 60/286; 60/295
(58) Field of Classification Search ............... 60/285, 60/286, 295
See application file for complete search history.

(56) References Cited

U.S. PATENT DOCUMENTS

| 2002/0148219 | A1 | 10/2002 | Matsuoka et al. | |
|---|---|---|---|---|
| 2005/0284134 | A1* | 12/2005 | Radhamohan et al. | 60/286 |
| 2007/0101703 | A1 | 5/2007 | Kanaya et al. | |
| 2009/0025370 | A1* | 1/2009 | Kondo et al. | 60/286 |

FOREIGN PATENT DOCUMENTS

| JP | 2002-038926 | | 2/2002 |
|---|---|---|---|
| JP | 3686666 | | 6/2005 |
| JP | 2006-233936 | | 9/2006 |
| JP | 2006233936 | A * | 9/2006 |

OTHER PUBLICATIONS

Japanese Office Action dated Feb. 10, 2009, issued in corresponding Japanese Application No. 2007-116656, with English translation.

* cited by examiner

*Primary Examiner* — Thomas Denion
*Assistant Examiner* — Jonathan Matthias
(74) *Attorney, Agent, or Firm* — Nixon & Vanderhye P.C.

(57) ABSTRACT

An exhaust emission control device has an additive valve and a control unit to decrease nitrogen oxides contained in an exhaust gas by means of a reducing agent. The control unit sets a valve opening period of time and a valve closing period of time alternately elapsing in a repetition cycle. The control unit controls the valve to discharge the agent into the exhaust gas during each valve opening period and to stop discharging the agent during each valve closing period. The control unit sets the valve opening period to be shortened as a flow rate of the exhaust gas is lowered, so that a penetration force of the reducing agent is appropriately set. The control unit sets the repetition cycle at a value depending on the flow rate of the nitrogen oxides to sufficiently deoxidize the nitrogen oxides by means of the agent.

4 Claims, 2 Drawing Sheets

EXHAUST EMISSION CONTROL DEVICE

CROSS-REFERENCE TO RELATED APPLICATION

This application is based upon and claims the benefit of priority of the prior Japanese Patent Application 2007-116656 filed on Apr. 26, 2007 so that the contents of which are incorporated herein by reference.

BACKGROUND OF THE INVENTION

1. Field of the Invention

The present invention relates to an exhaust emission control device for decreasing nitrogen dioxides contained in the exhaust gas of an internal combustion engine by means of a reducing agent to purify the exhaust gas.

2. Description of Related Art

An exhaust emission control device has been used to purify the exhaust gas emitted from an internal combustion engine. With this device, nitrogen oxides ($NO_x$) contained in the exhaust gas are deoxidized by a reducing agent. This reducing agent is, for example, formed of urea-containing water. When ammonia (NH3) produced by decomposition of urea (CO$(NH_2)_2$) reacts with nitrogen oxides on catalysts, the nitrogen oxides are deoxidized to harmless nitrogen ($N_2$) and water ($H_2O$) Therefore, nitrogen oxides contained in the exhaust gas are considerably decreased, so that the exhaust gas is purified.

Japanese Patent Specification No. 3686666 discloses an exhaust emission control device. This device has an additive valve directly attached to an exhaust piper the reducing agent is directly injected from the additive valve into the exhaust pipe so as to be dispersed in the exhaust gas. Therefore, the reducing agent is mixed with the exhaust gas, and the exhaust gas is purified.

However, because the flow rate of the exhaust gas in the exhaust pipe constantly fluctuates in response to the operation conditions of the engine, it is difficult to efficiently purify the exhaust gas by means of the reducing agent. For example, when the flow rate of the exhaust gas is lowered, the reducing agent injected from the additive valve reaches specific portions of catalysts and/or a pipe wall without being sufficiently dispersed in the exhaust gas. Therefore, the reducing agent is not efficiently used to purify the exhaust gas.

SUMMARY OF THE INVENTION

An object of the present invention is to provide, with due consideration to the drawbacks of the conventional, an exhaust emission control device which efficiently purifies exhaust gas by means of a reducing agent even when the flow rate of the exhaust gas fluctuates.

According to an aspect of this invention, the object is achieved by the provision of an exhaust emission control device for decreasing nitrogen oxide contained in exhaust gas, having an additive valve and a control unit. The additive valve discharges a reducing agent into the exhaust gas. The control unit sets a valve opening period of time and a valve closing period of time so as to alternately elapse in a repetition cycle of the valve opening periods and controls the additive valve to discharge the reducing agent during each valve opening period and to stop discharging the reducing agent during each valve closing period. The control unit sets the valve opening period at a value depending on a flow rate of the exhaust gas so as to shorten the valve opening period as the flow rate of the exhaust gas is lowered. The control unit sets the repetition cycle at a value depending on a flow rate of the nitrogen oxide.

With this structure of the control device, a spray of the reducing agent is discharged into the exhaust gas at a penetration force (i.e., spray pressure). As the penetration force is increased, the agent spay can penetrate through a larger quantity of exhaust gas. Therefore, when the flow rate of the exhaust gas is high, the reducing agent should have a strong penetration force to be effectively dispersed into the exhaust gas. In contrast, when the flow rate of the exhaust gas is low, the penetration force of the reducing agent should be weakened to prevent the reducing agent from adhering to surfaces of catalysts and/or a pipe wall surrounding the exhaust gas. Further, as a period of time (i.e., valve opening period) elapsing from a start of the opening of the valve is shortened, the penetration force becomes weakened.

In this invention, the control unit sets the valve opening period depending on or changeable with the flow rate of the exhaust gas so as to shorten the valve opening period as the flow rate of the exhaust gas is lowered. Therefore, even when the flow rate of the exhaust gas fluctuates, the reducing agent can be effectively dispersed into the exhaust gas, and the reducing agent can efficiently deoxidize the nitrogen oxide.

Further, to deoxidize the nitrogen oxide, an appropriate quantity of reducing agent corresponding to a quantity of nitrogen oxide is required. In this invention, the control unit sets the repetition cycle depending on the flow rate of the nitrogen oxide. Therefore, even when the flow rate of the nitrogen oxide fluctuates, the correct quantity of reducing agent required for deoxidization of the nitrogen oxide can be always discharged into the exhaust gas.

Accordingly, the control device can efficiently purify the exhaust gas by means of a reducing agent even when the flow rate of the exhaust gas fluctuates.

DETAILED DESCRIPTION OF THE PREFERRED EMBODIMENT

An exhaust emission control device has an additive valve that discharges a reducing agent into an exhaust gas containing a nitrogen oxide, and a control unit that sets a valve opening period of time and a valve closing period of time for the additive valve to alternately elapse in a repetition cycle of the valve opening periods and controls the additive valve to discharge the reducing agent during each valve opening period and to stop discharging the reducing agent during each valve closing period. To efficiently purify the exhaust gas by means of the reducing agent even when a flow rate of the exhaust gas fluctuates, the control unit sets the valve opening period at a value depending on or changeable with the flow rate of the exhaust gas so as to shorten the valve opening period as the flow rate of the exhaust gas is lowered, and the control unit sets the repetition cycle at a value depending on or changeable with the flow rate of the nitrogen oxide.

An embodiment of the present invention will now be described with reference to the accompanying drawings.

Figure 1:
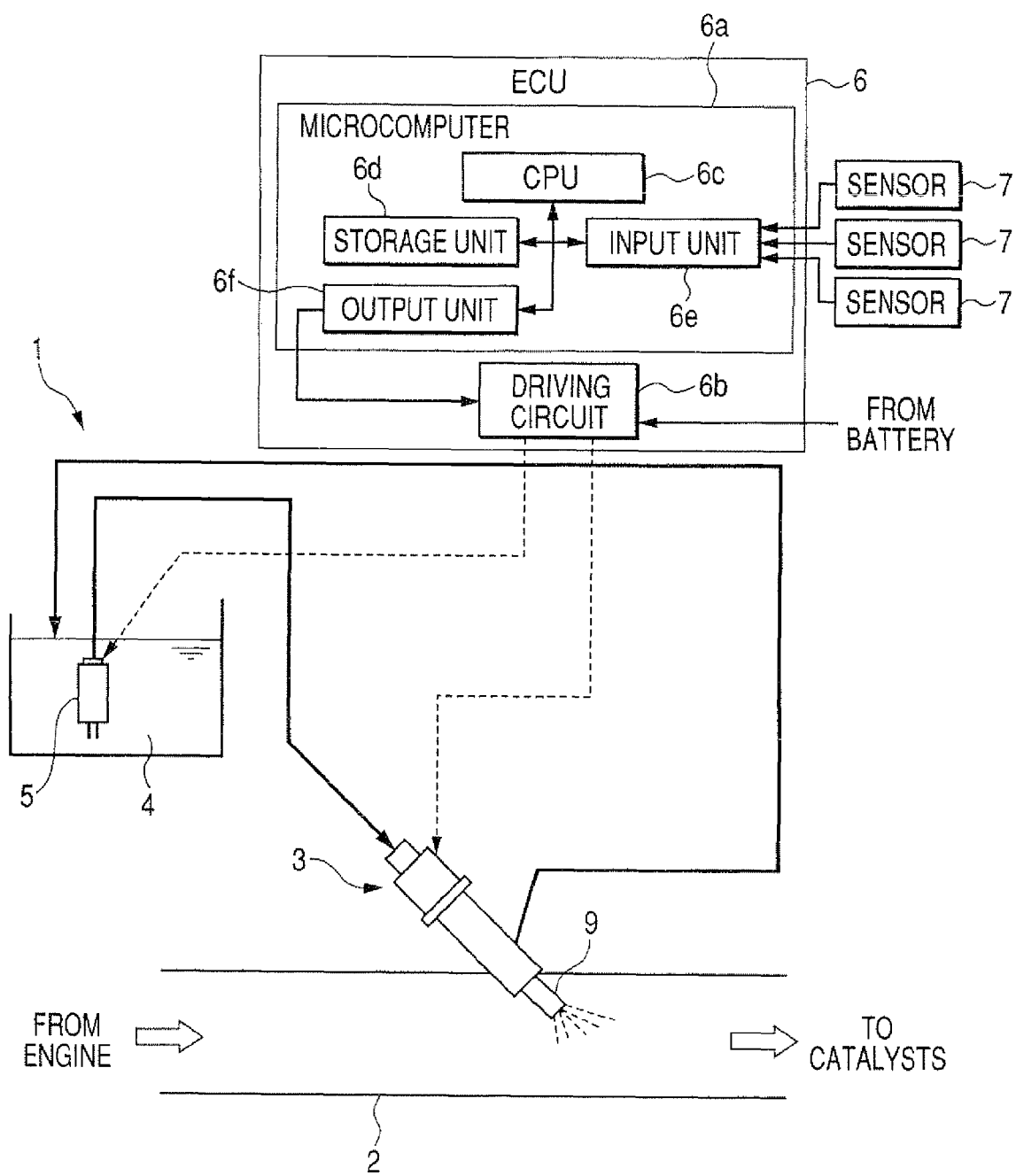
FIG. 1 is a structural view of an exhaust emission control device according to an embodiment of the present invention.

FIG. 1 is a structural view of an exhaust emission control device according to the embodiment. An exhaust emission control device 1 shown in FIG. 1 is, for example, mounted on a vehicle. An exhaust gas of an internal combustion engine (not shown) flows through an exhaust pipe. The exhaust gas contains nitrogen oxides ($NO_x$) With this device, a reducing agent is injected into the exhaust pipe to be supplied to the exhaust gas, and the nitrogen oxides are deoxidized by the reducing agent to purify the exhaust gas. This reducing agent is, for example, formed of urea-containing water. When ammonia (NH3) produced by decomposition of urea ($CO(NH_2)_2$) reacts with nitrogen oxides on catalysts, the nitrogen oxides are deoxidized to harmless nitrogen ($N_2$) and water ($H_2O$). Therefore, the exhaust gas is purified.

As shown in FIG. 1, the control device 1 has an additive valve 3, a supply pump 5 pumping out the reducing agent held in a tank 4 into the valve 3, and an electronic control unit (ECU) 6 controlling the valve 3 and the pump 5. The ECU 6 receives detection values indicating operation conditions of the engine from various sensors 7 such as an acceleration stroke sensor detecting the flow rate of fuel injected into the engine, an air flow meter measuring the flow rate of air taken into the engine, a crank angle sensor detecting the engine speed, an exhaust gas temperature sensor and the like. The ECU 6 controls the pumping operation of the pump 5 and the open-close operation of the valve 3 according to the detection values of the sensors 7. The valve 3 injects the reducing agent into an exhaust pipe 2 communicating with the engine. The exhaust gas flows through the exhaust pipe 2 at a flow rate changeable in response to operation conditions of the engine. Further, the flow rate of nitrogen oxides ($NO_x$) contained in the exhaust gas changes in response to the operation conditions of the engine.

The valve 3 is directly attached to the exhaust pipe 2, and a head portion 9 with a nozzle hole (not shown) in the valve 3 is projected into the exhaust pipe 2. The valve 3 receives the reducing agent discharged from the pump 5, transmits the reducing agent to the head portion 9 and injects the reducing agent from the nozzle hole.

The valve 3 has a solenoid coil (not shown) and a valve element (not shown). The solenoid coil generates a magnetic attraction force in response to electric power supplied to the valve 3 so as to drive the valve element in a valve opening direction. Therefore, when receiving the attraction force from the coil, the valve element opens the nozzle hole, and the valve 3 injects the reducing agent through the opened nozzle hole. That is, the valve 3 acts as an electromagnetic solenoid valve. The valve 3 further has a spring for forcibly pushing the valve element toward a valve closing direction. The spring accumulates a resilient force in response to the movement of the valve element in the valve opening direction. When the supply of the electric power to the valve 3 is stopped so as to generate no attraction force in the solenoid coil, the valve element is pushed toward the valve closing direction in response to the force of the spring. Therefore, the valve element closes the nozzle hole, and the valve 3 stops injecting the reducing agent. The reducing agent supplied to the valve 3 but not injected from the valve 3 is returned to the tank 4.

The ECU 6 has a well-known microcomputer 6a and a driving circuit 6b. The circuit 6b transmits electric power from a battery (not shown) to the solenoid coil of the valve 3 in response to a control signal outputted from the microcomputer 6a. The microcomputer 6a has a central processing unit (CPU) 6c, a storage unit 6d including a random access memory (RAM) and a read only memory (ROM), an input unit 6e and an output unit 6f. The CPU 6c produces a control signal from the detection values of the sensors 7 received in the input unit 6e according to a program (software) stored in the ROM, and outputs the control signal to the driving circuit 6b through the output unit 6f. The RAM temporarily stores the periods and the detection values of the sensors 7. Therefore, the ECU 6 can control an open-close operation of the valve 3 according to the detection values.

More specifically, the microcomputer 6a of the ECU 6 analyzes operation conditions of the engine from the detection values of the sensors 7 and sets a valve opening period of time and a valve closing period of time alternately elapsing in a repetition cycle of the valve opening periods according to the operation conditions of the engine. The repetition cycle equals a sum of one valve opening period and one valve closing period. The ECU 6 sends a control signal indicating both the valve opening period and the repetition cycle to the valve 3 and controls the valve 3 to alternately open and close the nozzle hole in response to the control signal. That is, the valve 3 opens the nozzle hole during each valve opening period and closes the nozzle hole during each valve closing period.

Further, the ECU 6 sets the valve opening period at a length depending on a mass flow rate of the exhaust gas, and sets the repetition cycle on the basis of the length of the valve opening period and a mass flow rate of the nitrogen oxides such that the repetition cycle changes with the flow rate of the nitrogen oxides. That is, as the flow rate of the exhaust gas is lowered, the ECU 6 sets the valve opening period to a lower value. In contrast, when the flow rate of the exhaust gas is increased, the ECU 6 sets the valve opening period to a higher value.

For example, the ECU 6 stores a threshold value, a first setting value, and a second setting value. The threshold value is determined for the flow rate of the exhaust gas. The second setting value is lower than the first setting value. When the flow rate of the exhaust gas is equal to or higher than the threshold value, the ECU 6 sets the valve opening period at the first setting value. In contrast, when the flow rate of the exhaust gas is lower than the threshold value, the ECU 6 sets the valve opening period at the second setting value.

The reason that the ECU 6 sets the valve opening period at one of the setting values according to a comparison result between the threshold value and the flow rate of the exhaust gas is described below. The reducing agent is injected from the nozzle hole of the valve 3 in a spray form. The agent spay penetrates through the exhaust gas at a penetration force along the injection direction. As the penetration force is increased, the agent spay can penetrate through a larger quantity of exhaust gas. Therefore, when the flow rate of the exhaust gas is high, the reducing agent should have a large penetration force to be effectively dispersed into the exhaust gas. In contrast, when the flow rate of the exhaust gas is low, the penetration force of the reducing agent should be small to prevent the reducing agent from adhering to surfaces of catalysts and/or a wall of the pipe 2. Further, as a period of time (i.e., valve opening period) elapsing from the start of the opening of the nozzle hole is shortened, the penetration force becomes weakened. When the valve opening period is considerably shortened, the penetration force is considerably weakened. The second setting value is used to considerably shorten the valve opening period. In contrast, the first setting value is used to set the valve opening period not considerably shortened. That is, the second setting value is considerably lower than the first setting value. Therefore, when the flow rate of the exhaust gas is lower than the threshold value, the ECU 6 sets the valve opening period at the second setting value such that the penetration force of the reducing agent is considerably weakened. In contrast, when the flow rate of the exhaust gas is equal to or higher than the threshold value, the ECU 6 sets the valve opening period at the first setting value such that the penetration force of the reducing agent is not considerably weakened but is sufficiently strong to disperse the reducing agent into the exhaust gas.

To changeably set the valve opening period, the ECU 6 directly detects a mass flow rate of the exhaust gas. Alternatively, the microcomputer 6a of the ECU 6 indirectly calculates a mass flow rate of the exhaust gas from a mass flow rate of air detected in the air flow meter and a mass flow rate of injected fuel detected in the stroke sensor.

Further, to discharge the reducing agent required for deoxidization of the nitrogen oxides from the valve 3, the ECU 6 changeably sets a value of the repetition cycle according to the length of the valve opening period and the flow rate of the nitrogen oxides. For example, the ECU 6 calculates a quantity of the nitrogen oxides in one valve opening period from the flow rate of the nitrogen oxides, calculates a first quantity of the reducing agent required for the deoxidization of the calculated quantity of nitrogen oxides, and calculates a second quantity of the reducing agent actually discharged from the valve 3 in one valve opening period. Then, the ECU 6 calculates a ratio of the second quantity to the first quantity and sets the repetition cycle at a product of the ratio and the valve opening period. Therefore, as the flow rate of the nitrogen oxides is increased, the repetition cycle is shortened so as to approach the valve opening period.

To changeably set the repetition cycle, the ECU 6 directly detects a mass flow rate of the nitrogen oxides. Alternatively, the microcomputer 6a of the ECU 6 indirectly calculates a mass flow rate of the nitrogen oxides from the detection values of the sensors 7. For example, the microcomputer 6a calculates the flow rate of the nitrogen oxides from an engine speed detected in the crank angle sensor, the temperature of the exhaust gas detected in the temperature sensor, the flow rate of injected fuel detected in the stroke sensor and the like.

The microcomputer 6a of the ECU 6 produces a control signal having a plurality of pulses set at an on level at equal intervals from the valve opening period and the repetition cycle. In the control signal, a period of time in each pulse is set to be equal to one valve opening period, and a period of time set at an off level between pulses is set to be equal to one valve closing period.

Figure 2A:
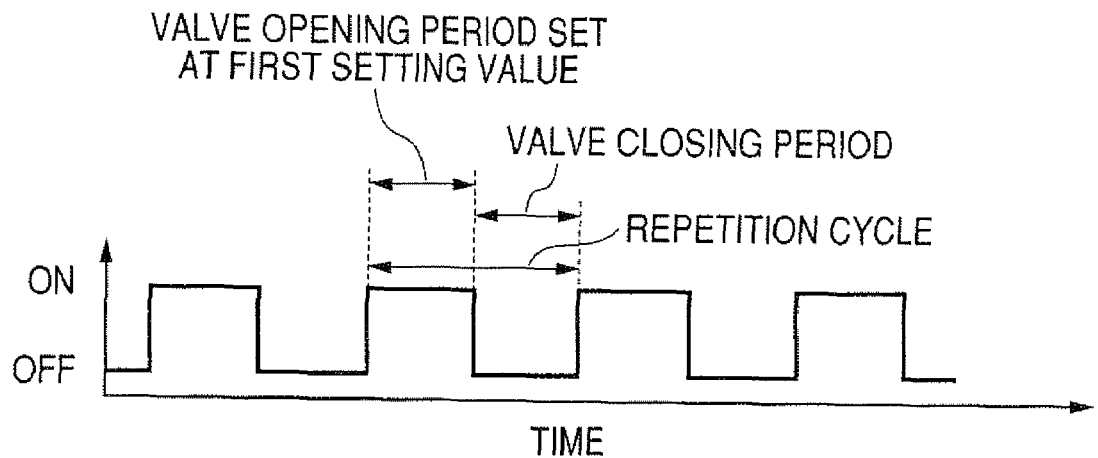
FIG. 2A shows a wave form of a control signal indicating both a valve opening period set at a first setting value and a repetition cycle.
Figure 2B:
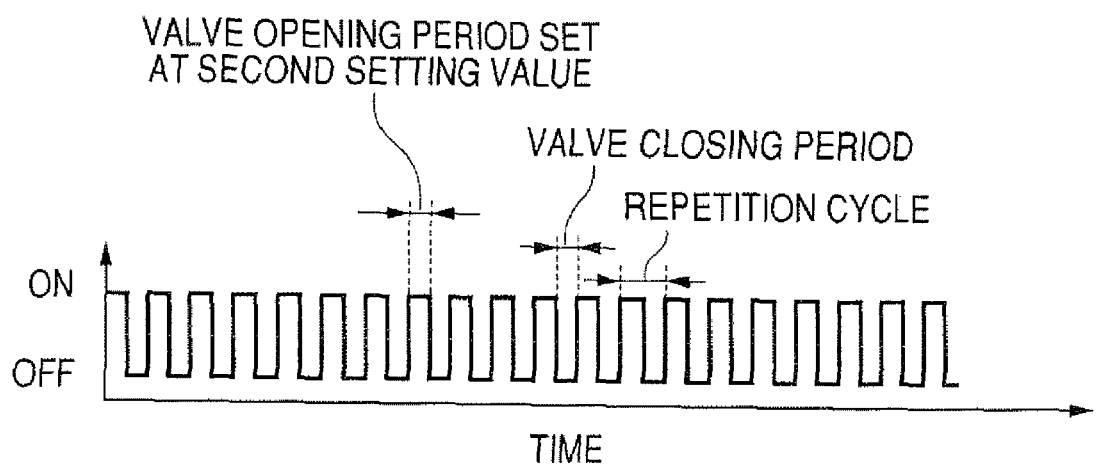
FIG. 2B shows a wave form of another control signal indicating both a valve opening period set at a second setting value and a repetition cycle.

FIG. 2A shows a wave form of a control signal indicating both a valve opening period set at a first setting value and a repetition cycle, while FIG. 2B shows a wave form of another control signal indicating both a valve opening period set at a second setting value and a repetition cycle.

As shown in FIG. 2A, when the flow rate of the exhaust gas is equal to or higher than the threshold value, the ECU 6 substantially sets a period of time (i.e., pulse width) in each pulse of the control signal at the first setting value. In contrast, as shown in FIG. 2B, when the flow rate of the exhaust gas is lower than the threshold value, the ECU 6 substantially sets a period of time in each pulse of the control signal at the second setting value such as $10^{-3}$ second (1 ms). Further, as shown in FIG. 2A and FIG. 2B, the ECU 6 sets a cycle of pulses in the control signal as the repetition cycle.

Therefore, as shown in FIG. 2A and FIG. 2B, even if the flow rate of the nitrogen oxides is constant in the exhaust gas, the repetition cycle corresponding to the valve opening period set at the second setting value becomes shorter than the repetition cycle corresponding to the valve opening period set at the first setting value.

Then, the microcomputer 6a outputs the control signal to the driving circuit 6b. The driving circuit 6b controls the supply of electric power to the valve 3 according to the control signal. That is, when the control signal is set at an on level, the circuit 6b supplies electric power to the valve 3 to open the nozzle hole of the valve 3. In contrast, when the control signal is set at an off level, the circuit 6b stops the supply of electric power to the valve 3 to close the nozzle hole of the valve 3. Therefore, the valve 3 discharges the reducing agent in response to each pulse of the control signal. That is, under control of the ECU 6, the valve 3 discharges the reducing agent every valve opening period, and the valve 3 stops discharging the reducing agent every valve closing period.

As described above, the ECU 6 always or periodically detects or calculates a mass flow rate of the exhaust gas and a mass flow rate of the nitrogen oxides contained in the exhaust gas, sets the valve opening period at a length depending on the flow rate of the exhaust gas such that the valve opening period is shortened as the flow rate of the exhaust gas is lowered, and sets the repetition cycle on the basis of the length of the valve opening period and the flow rate of the nitrogen oxides such that the repetition cycle depends on the flow rate of the nitrogen oxides.

Here, the reducing agent injected in a spray form penetrates through the exhaust gas at a penetration force along an injection direction, and the penetration force becomes weakened as the valve opening period is shortened. Therefore, when the exhaust gas flows at a high rate, the reducing agent should have a large penetration force so as to be effectively dispersed into the exhaust gas. In contrast, when the exhaust gas flows at a low rate, the penetration force of the reducing agent should be weakened to prevent the reducing agent from adhering to surfaces of catalysts and/or a wall of the pipe 2. Therefore, as the flow rate of the exhaust gas is lowered, the valve opening period should be shortened.

In this embodiment, when the flow rate of the exhaust gas is equal to or higher than the threshold value, the ECU 6 sets the valve opening period at the first setting value so as to not considerably weaken the penetration force of the reducing agent, and the ECU 6 calculates a value of the repetition cycle from the first setting value of the valve opening period and the mass flow rate of the nitrogen oxides. Then, the ECU 6 produces a control signal substantially set to the repetition cycle such that a period of time in each of pulses of the signal is substantially equal to the first setting value of the valve opening period, and controls the valve 3 to open the nozzle hole in response to each pulse and to close the nozzle hole during an off level of the control signal between pulses in each pair. Therefore, a spray of the reducing agent having a strong penetration force is dispersed into the exhaust gas so as to be effectively mixed with the exhaust gas, so that the nitrogen oxides can be efficiently deoxidized by means of the reducing agent.

In contrast, when the flow rate of the exhaust gas is decreased so as to be lower than the threshold value, the ECU 6 changes the valve opening period from the first setting value to the second setting value to considerably weaken the penetration force of the reducing agent, and the ECU 6 calculates a value of the repetition cycle from the second setting value of the valve opening period and the flow rate of the nitrogen oxides. Then, the ECU 6 produces a control signal substantially set at the repetition cycle such that a period of time in each of pulses of the signal is substantially equal to the second setting value of the valve opening period, and controls the valve 3 by means of the control signal in the same manner. Therefore, the exhaust emission control device 1 can prevent the reducing agent from adhering to surfaces of catalysts and/or a wall of the pipe 2.

Accordingly, because the control device 1 sets the valve opening period according to the flow rate of the exhaust gas so as to adjust the penetration force of the reducing agent appropriate to the flow rate of the exhaust gas, the device 1 can always disperse the reducing agent into the exhaust gas in preferable mixing conditions, regardless of a change in the flow rate of the exhaust gas. Especially, when the flow rate of the exhaust gas is decreased, the control device 1 shortens the valve opening period to considerably weaken the penetration force of the reducing agent. Accordingly, the device 1 can prevent the reducing agent from adhering to surfaces of catalysts and/or a wall of the pipe 2 so as to efficiently use the reducing agent for deoxidization of the nitrogen oxides.

Further, because the control device 1 sets the repetition cycle according to the length of the valve opening period and the flow rate of the nitrogen oxides, a quantity of reducing agent required to deoxidize the nitrogen oxides can be reliably injected into the exhaust gas. Accordingly, the control device 1 can efficiently and reliably purify the exhaust gas by means of the reducing agent even when a flow rate of the exhaust gas fluctuates.

Moreover, when the flow rate of the exhaust gas is equal to or higher than the threshold value, the control device 1 sets the valve opening period at the first setting value to not considerably weaken the penetration force of the reducing agent. In contrast, when the flow rate of the exhaust gas is lower than the threshold value, the control device 1 sets the valve opening period at the second setting value (which is lower than the first setting value) to considerably weaken the penetration force of the reducing agent. That is, the device 1 simply judges whether the exhaust gas flows at a rate higher than the threshold value, and the device 1 simply selects one of the setting values according to the judgment result. Accordingly, the control device 1 can easily control the injection of the reducing agent from the value 3 so as to appropriately set the penetration force of the reducing agent such that the reducing agent is dispersed into the exhaust gas in preferable mixing conditions.

MODIFICATION 1

In this embodiment, regardless of a change in the flow rate of the exhaust gas, the repetition cycle is set at a value depending on the flow rate of the nitrogen oxides. However, when the flow rate of the exhaust gas is equal to or higher than the threshold value, a value of the repetition cycle may be fixed at an appropriate value such as 0.1 second (corresponding to 10 Hz) regardless of a change in the flow rate of the exhaust gas or a change in the flow rate of the nitrogen oxides, while the valve opening period is set at a length depending on the flow rate of the nitrogen oxides. In contrast, when the flow rate of the exhaust gas is lower than the threshold value, the length of the valve opening period may be fixed at an appropriate value such as $10^{-3}$ second (1 ms) regardless of a change in the flow rate of the exhaust gas or a change in the flow rate of the nitrogen oxides, while the repetition cycle is set at a value depending on the flow rate of the nitrogen oxides. That is, when the flow rate of the exhaust gas is lower than the threshold value, the valve opening period and the repetition cycle are set in the same manner as in the embodiment.

For example, when the exhaust gas flows at a rate equal to or higher than the threshold value, the valve opening period is set in a range that the penetration force of the reducing agent is not considerably weakened, and the valve opening period and the repetition cycle are set such that a quantity of the reducing agent actually injected from the valve 3 in one valve opening period is substantially equal to a quantity of the reducing agent required to deoxidize the quantity of nitrogen oxides flowing in one repetition cycle.

Therefore, because the repetition cycle is fixed when the exhaust gas flows at a rate equal to or higher than the threshold value, the device 1 merely adjusts a duty ratio in the control signal set at a fixed frequency. Accordingly, the device 1 can easily control the deoxidization of nitrogen oxides while appropriately adjusting the dispersion of the reducing agent into the exhaust gas.

MODIFICATION 2

Further, in this embodiment, the length of the valve opening period is selected from two fixed setting values according to the flow rate of the exhaust gas. However, when the flow rate of the exhaust gas changes at a varying rate, the ECU 6 may set the valve opening period at a length successively changeable with the varying rate. For example, when the flow rate of the exhaust gas is lowered at a decreased rater the ECU 6 successively shortens the valve opening period according to the rate of decrease. In contrast, when the flow rate of the exhaust gas is increased at an increasing rate, the ECU 6 successively lengthens the valve opening period according to the rate of increase.

Accordingly, because the penetration force of the reducing agent is successively set at a changeable strength optimum to the dispersion of the reducing agent into the exhaust gas, the reducing agent can be always dispersed into the exhaust gas under preferred conditions, and the exhaust gas can be further efficiently purified even when the flow rate of the exhaust gas fluctuates.

OTHER MODIFICATIONS

In this embodiment, the ECU 6 sets the valve opening period and the repetition cycle of the valve opening periods according to a mass flow rate of the exhaust gas and a mass flow rate of the nitrogen oxides. However, the ECU 6 sets the valve opening period and the repetition cycle of the valve opening periods according to a volume flow rate of the exhaust gas and a volume flow rate of the nitrogen oxides. In this case, each flow rate is converted into amass flow rate according to a pressure and a temperature of the exhaust gas.

Further, the device 1 decreases the nitrogen oxides by means of the reducing agent to purify the exhaust gas. However, only one nitrogen oxide such as NO, $NO_2$ or the like may be decreased in the exhaust gas.

Moreover, the exhaust gas is discharged from the engine. However, the device 1 may purify the exhaust gas discharged from a production plant or the like.

Furthermore, the device 1 decreases the nitrogen oxides by means of the reducing agent. However, the device 1 may decrease hydrocarbons, carbon monoxide (CO), sulfur oxides (SOx) or the like by means of a suitable agent.

Still further, the repetition cycle of the valve opening periods is changeably set at a repetition value not changed with time. However, the repetition cycle may be changed with time such that an average of the repetition cycle becomes equal to the repetition value in a predetermined period of time. Further, in the same manner, each of the valve opening and closing periods may be changed with time.

Still further, the valve 3 is rapidly opened and closed in response to each pulse of the control signal. However, the valve 3 may be gradually opened and closed in response to a signal of which a level is gradually changed in a sine wave form or the like.

Still further, the ECU 6 may set the valve opening period at the first setting value when the flow rate of the exhaust gas is higher than the threshold value, and the ECU 6 may set the valve opening period at the second setting value when the flow rate of the exhaust gas is equal to or lower than the threshold value.

These embodiment and modifications should not be construed as limiting the present invention to structures of those embodiments, and the structure of this invention may be combined with that based on the prior art.

What is claimed is:

1. An exhaust emission control device for decreasing nitrogen oxide contained in exhaust gas, comprising:
    an additive valve that discharges a reducing agent into the exhaust gas; and
    a control unit that sets a valve opening period of time and a valve closing period of time so as to alternately elapse in a repetition cycle of the valve opening periods and controls the additive valve to discharge the reducing agent during each valve opening period and to stop discharging the reducing agent during each valve closing period,
    wherein the control unit fixes the valve opening period at a first value when a flow rate of the exhaust gas is lower than a threshold value, the control unit sets the valve opening period at a second value, which is higher than the first value and depends on the flow rate of the exhaust gas and flow rate of the nitrogen oxide so as to shorten the valve opening period as the flow rate of the exhaust gas is lowered, when the flow rate of the exhaust gas is higher than the threshold value, the control unit sets the repetition cycle at a third value depending on the flow rate of the nitrogen oxide when the flow rate of the exhaust gas is lower than the threshold value, and the control unit fixes the repetition cycle at a fourth value when the flow rate of the exhaust gas is higher than the threshold value.

2. The device according to claim 1, wherein the control unit sets the valve opening period at a value successively changeable with a varying rate in the flow rate of the exhaust gas when the flow rate of the exhaust gas changes at the varying rate.

3. A method of controlling exhaust emission to decrease nitrogen oxide contained in exhaust gas, the method comprising:
    setting a valve opening period of time and a valve closing period of time so as to alternately elapse in a repetition cycle of the valve opening periods; and
    controlling an additive valve that discharges a reducing agent into exhaust gas to discharge the reducing agent during each valve opening period and to stop discharging the reducing agent during each valve closing period,
    wherein the valve opening period is fixed at a first value when a flow rate if the exhaust gas is lower than a threshold value, and the value opening period is set at a second value, which is higher than the first value and depends on the flow rate of the exhaust gas flow rate of the nitrogen oxide so as to shorten the value opening period as the flow rate of the exhaust gas is lowered, when the flow rate of the exhaust gas is higher than the threshold value; and
    wherein the repetition cycle is set at a third value depending on the flow rate of the nitrogen oxide when the flow rate of the exhaust gas is lower than the threshold value, and the repetition cycle is fixed at a fourth value when the flow rate of the exhaust gas is higher than the threshold value.

4. The method according to claim 3, wherein the valve opening period is set at a value successively changeable with a varying rate in the flow rate of the exhaust gas when the flow rate of the exhaust gas changes at the varying rate.

\* \* \* \* \*